(12) United States Patent
Mellot

(10) Patent No.: US 8,264,462 B2
(45) Date of Patent: Sep. 11, 2012

(54) MOTION ESTIMATION WITH ADAPTATION OF THE CORRELATION BLOCK SIZE

(75) Inventor: Pascal Mellot, Lans en Vercors (FR)

(73) Assignee: STMicroelectronics S.A., Montrouge (FR)

( * ) Notice: Subject to any disclaimer, the term of this patent is extended or adjusted under 35 U.S.C. 154(b) by 1067 days.

(21) Appl. No.: 12/130,063

(22) Filed: May 30, 2008

(65) Prior Publication Data

US 2008/0316174 A1 Dec. 25, 2008

(30) Foreign Application Priority Data

May 31, 2007 (FR) ...................................... 07 55375

(51) Int. Cl.
*G09G 5/08* (2006.01)
(52) U.S. Cl. .......................... 345/166; 345/158; 345/163
(58) Field of Classification Search ........... 345/156–166
See application file for complete search history.

(56) References Cited

U.S. PATENT DOCUMENTS

| 7,903,738 B2* | 3/2011 | Chou et al. ............... 375/240.16 |
| 2003/0189548 A1* | 10/2003 | Rovati et al. .................. 345/163 |
| 2004/0100444 A1* | 5/2004 | Park et al. ..................... 345/166 |
| 2006/0159177 A1* | 7/2006 | Mellot ..................... 375/240.16 |
| 2006/0222075 A1* | 10/2006 | Zhang et al. ............. 375/240.16 |
| 2007/0019733 A1* | 1/2007 | Mellot ..................... 375/240.16 |
| 2007/0040805 A1* | 2/2007 | Mellot .......................... 345/166 |
| 2007/0252814 A1* | 11/2007 | Lin et al. ........................ 345/158 |

FOREIGN PATENT DOCUMENTS

EP 1574994 A1 9/2005

OTHER PUBLICATIONS

Tan et al., "Rapid Estimation of Camera Motion from Compressed Video with Application to Video Annotation," IEEE Transactions on Circuits and Systems for Video Technology, 10(1):133-146, Feb. 2000.
Wang et al., "An improved variable-size block-matching algorithm," Multimedia Tools and Applications, 34:221-237, Jan. 27, 2007.

* cited by examiner

*Primary Examiner* — Amare Mengistu
*Assistant Examiner* — Premal Patel
(74) *Attorney, Agent, or Firm* — Seed IP Law Group PLLC

(57) ABSTRACT

A process for determining the displacement of an entity equipped with a sensor for capturing a sequence of images, comprising a step for determining a motion vector associated with a current image as a function of at least one correlation calculation between a first block of pixels in the current image and a second block of pixels from which the vector points towards said first block of pixels, with said second block being in a previous image in the sequence of images, wherein the dimensions of the first block are determined as a function of at least a motion vector associated with a previous image in the image sequence.

23 Claims, 3 Drawing Sheets

MOTION ESTIMATION WITH ADAPTATION OF THE CORRELATION BLOCK SIZE

BACKGROUND

1. Technical Field

This disclosure relates to techniques for estimating motion, applicable to a sequence of images provided directly or indirectly by an image sensor in motion, for example for the purposes of determining the motion of an entity equipped with this image sensor. The subject matter of this disclosure is particularly suitable for use in an optical mouse which can be connected to a computer system.

2. Description of the Related Art

Generally the mouse is moved over a suitable surface, and a video sensor attached to the mouse captures images from this surface while it is in motion. The displacement of the mouse can thus be reconstructed from the relative positions of objects in the successively captured images. From this displacement, one can deduce a displacement which can be given to a cursor representing the movement of the mouse on the computer screen.

Certain processes of this type are used in another technical field: video compression.

The techniques for estimating the motion of an entity from a sequence of images are based on associating a motion vector with each of the processed images. Such a vector has a vertical component and a horizontal component. It represents the motion of the mouse between one image to another. The motion of all the pixels in each image to be processed can be represented by a single motion vector.

This type of device is subject to specific technical constraints, particularly a time constraint. The image processing must be performed within a very short period so that the mouse movement can be indicated on the computer screen in a manner which appears instantaneous to the user. Another very important constraint on this type of device is the production cost.

In certain cases, particularly for the purposes of reducing the processing time, the mouse movement between two successive images is estimated by determining the motion between the two images in a portion of the image, composed of a given block of pixels. In what follows, the block of pixels used in this way is called the "correlation block". The size of this block is called the "correlation window".

FIGS. 1a, 1b and 1c illustrate a definition of a vector indicating the motion between two successively processed images 101 and 102 in a sequence. The image 101 is a previously processed image: a motion vector has therefore already been associated with it. The image 102 is an image currently being processed in order to associate it with a motion vector representing the mouse movement occurring between the image 101 and the image 102.

The images in the sequence containing the images 101 and 102 each comprise a given number of pixels, for example N×N for a square image with dimensions of N pixels by N pixels. N can, for example, be equal to 20.

The motion vector between the two images 101 and 102 is determined on the basis of a block of pixels of fixed dimensions comprised within the images.

For example, the size of the block of pixels is x multiplied by y, if the block is x pixels in width along the X axis (horizontal axis for example) and y pixels in height along the Y axis (vertical axis for example). For example, x=y=n. For example, when N is equal to 20, n may be equal to 14.

To determine the motion vector between the two images 101 and 102, consider for example in image 101 the block 11 of pixels with dimensions of n pixels by n pixels, centered relative to the center of the image 101.

Next, some candidate motion vectors are defined, which are vectors likely to represent the movement of the mouse between the two images 101 and 102. These candidate vectors are generally defined as a function of the motion vectors previously associated with the images preceding the image 102 in the sequence of images captured by the mouse.

Then, successively considering each candidate motion vector defined in that manner:

the candidate motion vector is applied to the block of pixels 11 defined in the image 101: the result of this translation applied to the block of pixels 11 is a block of pixels with dimensions of n pixels by n pixels pointed to in the image 102, a correlation is then calculated between the values of the pixels in the block 11 of pixels in the image 101 and the values of the pixels in the corresponding block of pixels pointed to in the image 102.

Next the candidate motion vector is selected which had the highest calculated correlation among the successively considered motion vectors. This vector is then associated with the current image 102.

In the case illustrated in FIGS. 1a, 1b and 1c, the selected motion vector is represented by the arrow 105. The movement of the mouse between the image 101 and the image 102 is represented by this motion vector 105 associated with the image 102.

The result of the translation by the selected motion vector 105 of the correlation block 11 with dimensions of n pixels by n pixels, in the image 101, is the block 12 with dimensions of n pixels by n pixels, in the image 102.

The size of the correlation block used to estimate the displacement of the mouse has an impact on the performance of the mouse movement estimation.

First, the size of the correlation block relative to the image size limits the maximum detectable values of the motion vector representing the movement of the mouse between two images.

Next, the greater the size of the correlation block relative to the size of the image, the more accurate the motion estimate, because it is then less sensitive to noise: the signal-to-noise ratio decreases when the number of pixels increases. However, when the size of the correlation block is large relative to the image, estimating the motion vectors during high mouse displacement speeds requires a high image capture frequency and image processing frequency.

Lastly, the smaller the size of the block relative to the size of the image, the more it is possible to determine motion vectors corresponding to high mouse displacement speeds at a constant image capture frequency.

It is therefore necessary to create a compromise between the precision of the estimation, the frequency of the image capture, and the size of the image.

BRIEF SUMMARY

A module for reliably estimating mouse movement typically requires meeting at least two of the following constraints: a sensor comprising a network of sensor elements of large dimensions, a high image capture frequency, and a large correlation block size. Each of these constraints is costly in terms of hardware and/or processing capacity.

The subject matter of the present disclosure aims to reduce the constraints which must be met in order to achieve a reliable estimate of the movement of an entity equipped with an image sensor. For this purpose, a first aspect of an embodiment proposes a process for determining the displacement of an entity equipped with a sensor for capturing a sequence of images, comprising a step of determining a motion vector associated with a current image in the image sequence, as a function of at least one correlation calculation performed between a first block of pixels in the current image and, in a previous image in the image sequence, a second block of pixels from which the vector points to said first block of pixels.

In such a process, the dimensions of the first block are determined as a function of at least a motion vector associated with an image preceding the current image in the image sequence.

Such a process facilitates adapting the processing to the mouse displacement speed and may have the effect of allowing the determination of motion vectors for the same maximum mouse displacement speed as in the prior art, while using a network of sensors of a smaller size and/or a smaller image capture frequency than those required in the prior art.

Similarly, such a process may yield similar accuracy in estimating displacement at low displacement speeds, while using a network of sensors of a smaller size and/or a smaller image capture frequency than those required in the prior art.

In one embodiment, the size of the first block is a decreasing function of the motion vector associated with the previous image in the image sequence. This facilitates a precise determination of a normal motion vector for the current image which is superior to the maximum determinable normal vector in the previous image when the speed increases.

In one embodiment, the dimensions of the first block are determined as a function of at least the motion vectors respectively associated with the previous images in the sequence of images. This arrangement smoothes the variation in the size of the block over several images.

In one embodiment, a parameter is estimated as a function of at least the motion vectors respectively associated with previous images in the sequence, indicating an evolution in a displacement speed of the entity, and the size of the first block is a decreasing function of said parameter. This arrangement facilitates determining with precision a normal motion vector for the current image which is superior to the maximum determinable normal vector in the previous image when the speed increases.

In one embodiment, the size of the first block is additionally determined as a function of at least a block size used in determining the motion vector associated with at least one previous image. This arrangement allows a more fine-tuned adjustment of the block size as a function of the evolution of the mouse displacement speed.

In another embodiment, the block size does not depend on the size of the previous block, but on one of the respective motion vector(s) determined for one of the previous images.

In one embodiment, a parameter is estimated as a function of at least the motion vectors respectively associated with the previous images in the sequence, with said parameter indicating an evolution in the displacement speed of the entity.

If the parameter indicates an increase in this speed, the determined size of the first block is less than the size of the block used when determining the motion vector associated with a previous image. Once it has been detected that the mouse displacement speed is increasing, this allows determining a normal motion vector which is greater than the previous maximum determinable normal vector.

In one embodiment, if the parameter indicates a decrease in this speed, the determined size of the first block is greater than the block size used in determining the motion vector associated with a previous image. This allows determining the motion vector with more precision than in the previous determination, while guaranteeing that the maximum value of the displacement vector determinable according to the new correlation block size is suitable for the estimation to be performed.

In one embodiment, to determine a motion vector associated with a current image in the image sequence, the steps comprise:
  generating a plurality of candidate motion vectors,
  for each of the candidate motion vectors, calculating the correlation between the first block of pixels in the current image and, in a previous image in the image sequence, a second block of pixels from which said candidate vector points to said first block of pixels,
  selecting a motion vector as a function of a comparison between the calculated correlations and associating said selected motion vector with the current image.

A second aspect of an embodiment proposes a computer program, which can for example be installed in a displacement determination module of an entity equipped with a sensor for capturing a sequence of images, with this program comprising instructions for implementing the steps of a process according to the first aspect when the program is executed by the processing means of the module.

A third aspect of an embodiment proposes a module for determining the displacement of an entity equipped with a sensor for capturing a sequence of images, comprising a means for implementing a process according to the first aspect. For example, the module can comprise a processing means adapted to execute the computer program according to the third aspect.

A fourth aspect of an embodiment proposes an optical mouse comprising an image sensor and a determination module according to the first aspect.

In one embodiment, a process for determining the displacement of an entity equipped with a sensor for capturing a sequence of images comprises: determining dimensions of a first block of pixels in a current image in the sequence of images as a function of a motion vector associated with an image preceding the current image in the sequence of images; and determining a motion vector associated with the current image in the sequences of images as a function of at least one correlation calculated between the first block of pixels in the current image and a second block of pixels from which the vector points towards said first block of pixels, with the second block being in a previous image in the sequence of images. In one embodiment, a size of the first block is a decreasing function of the motion vector associated with the previous image in the sequence of images. In one embodiment, the dimensions of the first block are determined as a function of a plurality of motion vectors associated with previous images in the sequence of images. In one embodiment, the process further comprises estimating a parameter as a function of the plurality of motion vectors respectively associated with previous images in the sequence of images, with the parameter indicating an evolution in a displacement speed of the entity, and wherein the size of the first block is a decreasing function of the parameter. In one embodiment, a size of the first block is determined as a function of at least one block size used in determining the motion vector associated with the image preceding the current image in the sequence of images. In one embodiment, the dimensions of the first block are determined as a function of a plurality of motion vectors associated with previous images in the sequence of images and the process further comprises estimating a parameter as a function of the plurality of motion vectors respectively associated with previous images in the sequence, with the parameter indicating an evolution of a displacement speed of the entity, and wherein if the parameter indicates an increase in the speed, the determined size of the first block is less than a size of the second block. In one embodiment, the dimensions of the first block are determined as a function of a plurality of motion vectors associated with previous images in the sequence of images and the process further comprises estimating a parameter as a function of the plurality of motion vectors respectively associated with previous images in the sequence, with the parameter indicating an evolution of a displacement speed of the entity, and wherein if the parameter indicates a decrease in the speed, the determined size of the first block is greater than a size of the second block. In one embodiment, determining the motion vector associated with the current image in the sequence of images comprises: generating a plurality of candidate motion vectors; for each of the candidate motion vectors, calculating a correlation between the first block of pixels in the current image and the second block of pixels; and selecting the motion vector associated with the current image as a function of a comparison between the correlation calculations performed. In one embodiment, the second block is in the image immediately preceding the current image in the sequence of images.

In one embodiment, a computer-readable memory medium's contents cause a processor to perform a method, the method comprising: determining dimensions of a first block of pixels in a current image in a sequence of images as a function of a motion vector associated with an image preceding the current image in the sequence of images; and determining a motion vector associated with the current image in the sequences of images as a function of at least one correlation calculated between the first block of pixels in the current image and a second block of pixels from which the vector points towards said first block of pixels, with the second block being in a previous image in the sequence of images. In one embodiment, a size of the first block is a decreasing function of the motion vector associated with the previous image in the sequence of images. In one embodiment, the dimensions of the first block are determined as a function of a plurality of motion vectors associated with previous images in the sequence of images. In one embodiment, the method further comprises: estimating a parameter as a function of the plurality of motion vectors respectively associated with previous images in the sequence of images, with the parameter indicating an evolution in a displacement speed of the entity, and wherein the size of the first block is a decreasing function of the parameter. In one embodiment, a size of the first block is determined as a function of at least one block size used in determining the motion vector associated with the image preceding the current image in the sequence of images. In one embodiment, the dimensions of the first block are determined as a function of a plurality of motion vectors associated with previous images in the sequence of images and the method further comprises estimating a parameter as a function of the plurality of motion vectors respectively associated with previous images in the sequence, with the parameter indicating an evolution of a displacement speed of the entity, and wherein if the parameter indicates an increase in the speed, the determined size of the first block is less than a size of second block. In one embodiment, determining the motion vector associated with the current image in the sequence of images comprises: generating a plurality of candidate motion vectors; for each of the candidate motion vectors, calculating a correlation between the first block of pixels in the current image and the second block of pixels; and selecting the motion vector associated with the current image as a function of a comparison between the correlation calculations performed.

In one embodiment, a circuit comprises: a memory configured to store historical data associated with an image in a sequence of images preceding a current image in the sequence of images; a correlation block dimension generator coupled to the memory and configured to generate dimensions of a correlation block of pixels associated with the current image in the sequence of images based on the stored historical data; and an image motion vector generator coupled to the memory and configured to generate a motion vector associated with the current image based on the stored historical data and the correlation block of pixels associated with the current image. In one embodiment, the circuit further comprises an optical sensor coupled to the memory. In one embodiment, the historical data further includes data associated with a second image preceding the current image in the sequence of images. In one embodiment, the historical data associated with the image preceding the current image includes a motion vector associated with the image preceding the current image. In one embodiment, the historical data associated with the image preceding the current image includes a correlation block of pixels associated with the image preceding the current image. In one embodiment, the image motion vector generator is configured to generate the motion vector associated with the current image by: generating a plurality of candidate motion vectors; for each of the candidate motion vectors, calculating a correlation between the correlation block of pixels associated with the current image and a correlation block of pixels associated with the image preceding the current image in the sequence of images; and selecting the motion vector associated with the current image based on a comparison of the calculated correlations.

In one embodiment, an optical mouse comprises: means for storing historical data associated with an image in a sequence of data preceding a current image in the sequence of images; means for selectively modifying dimensions of a correlation block of pixels associated with the current image in the sequence of images based on the stored historical data; and means for generating a motion vector associated with the current image based on the stored historical data and the correlation block of pixels associated with the current image. In one embodiment, the means for selectively modifying the dimensions of the correlation block of pixels associated with the current image comprises a correlation block dimension generator.

In one embodiment, a system comprises: means for generating a sequence of images; means for storing historical data associated with an image in the sequence of images preceding a current image in the sequence of images; means for generating dimensions of a correlation block of pixels associated with the current image in the sequence of images based on the stored historical data; and means for generating a motion vector associated with the current image based on the stored historical data and the correlation block of pixels associated with the current image. In one embodiment, the means for generating the dimensions of the correlation block of pixels associated with the current image comprises a correlation block dimension generator.

BRIEF DESCRIPTION OF THE SEVERAL VIEWS OF THE DRAWINGS

Other features and advantages of embodiments will become more clear upon reading the description which follows. This description is purely illustrative and is to be read while referring to the attached drawings, in which.

DETAILED DESCRIPTION

Embodiments are particularly described in how they apply to motion detection for the optical mouse. It is possible to deduce an application for any system in which an image sequence is processed in order to detect the motion of a mobile sensor relative to a fixed point of reference.

Figure 1A:
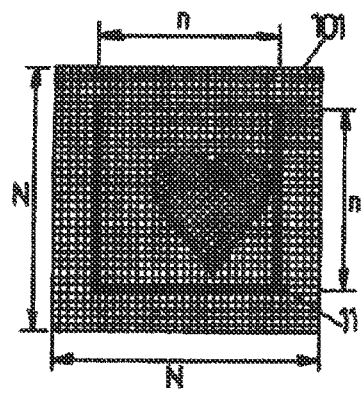
FIGS. 1a, 1b and 1c, already discussed, illustrate a definition of a motion vector between two successive images in an image sequence.
Figure 1B:
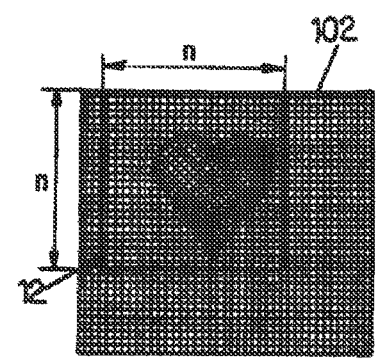
Figure 1C:
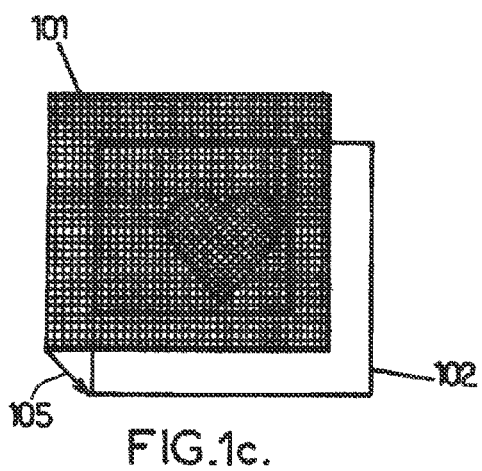
Figure 2:
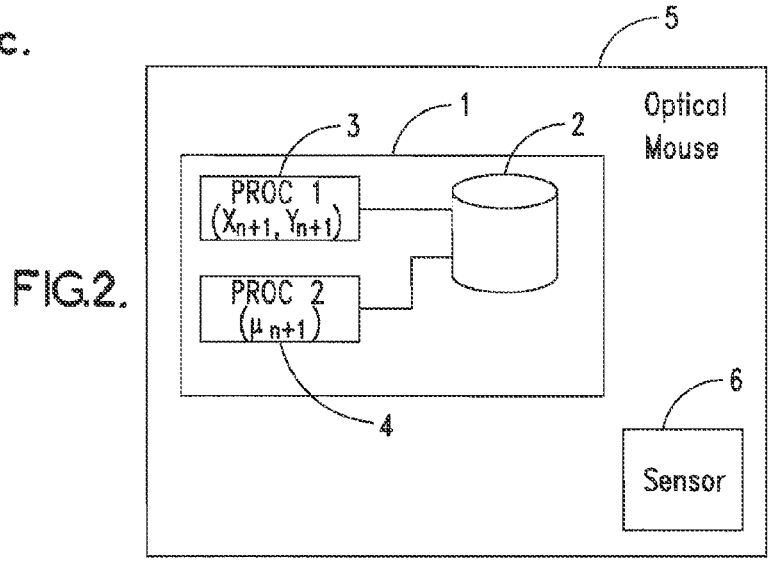
FIG. 2 represents a motion determination module in one embodiment.

FIG. 2 represents a motion determination module 1 in one embodiment, comprising a memory 2, a correlation block dimension generator or module 3 for implementing a first process Proc1, and a motion vector generator or module 4 for implementing a second process Proc2. This process Proc2 is based on the principles of a process as described in the patent application FR0507167.

In one embodiment, the module 1 is carried by an optical mouse 5, similarly to the mobile sensor 6.

Figure 3:
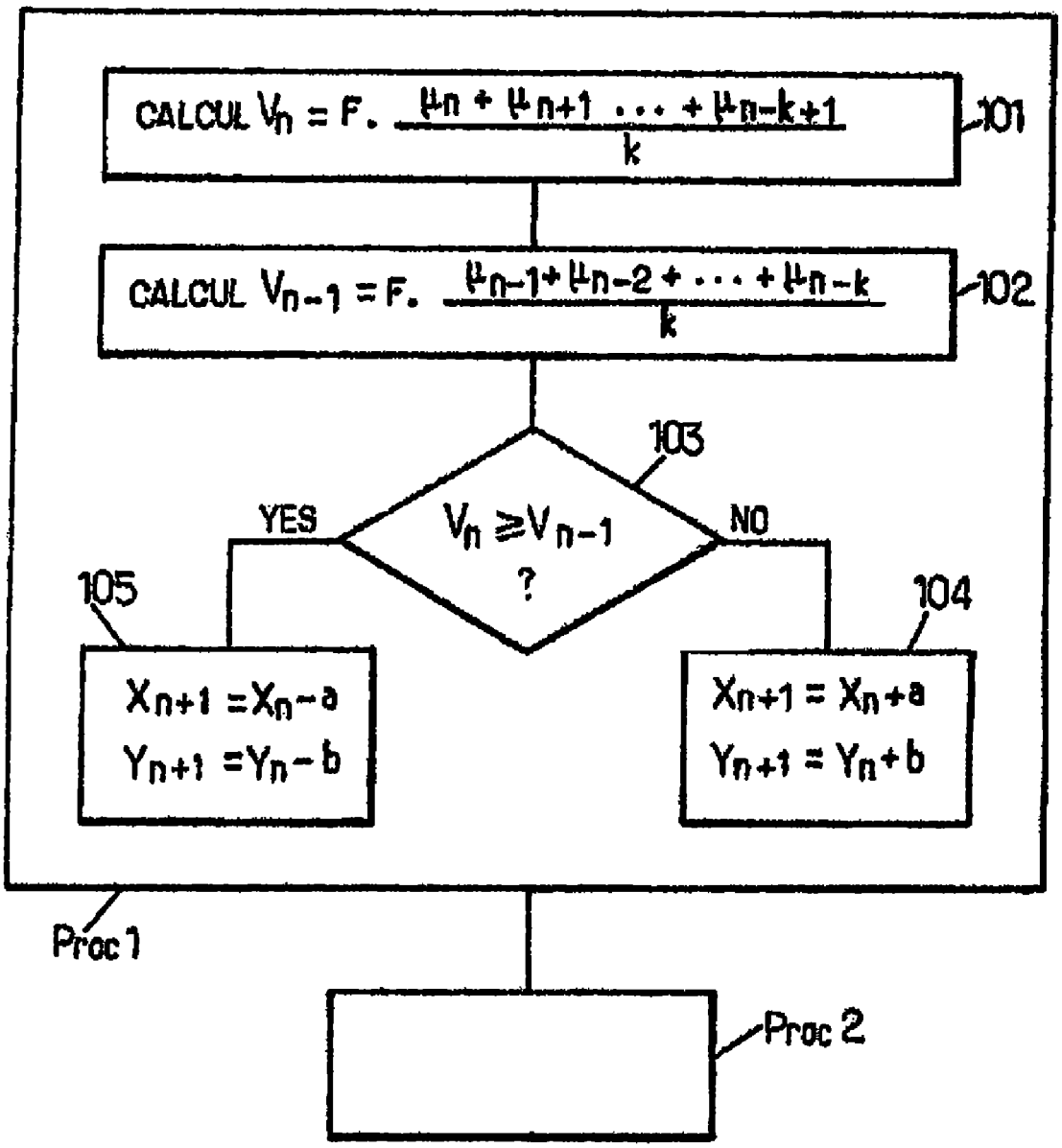
FIG. 3 illustrates the steps of a motion determination process, comprising two processes Proc1 and Proc2, in one embodiment, and FIG. 4 more specifically illustrates the steps in the process Proc2 in one embodiment.

FIG. 3 illustrates the main steps of a displacement determination process according one embodiment.

These steps can be applied for each image captured by the sensor incorporated into the mouse. This is the case considered below, with the image capture frequency being equal to F images/second.

Under certain circumstances, it may be advantageous to process only some of the captured images using these steps.

Let us assume that a plurality of images of a fixed size, in the sequence $I_1, I_2, \ldots, I_n$, have previously been processed. Therefore, associated with each of these images is a motion vector of two dimensions along the X and Y axes, respectively $\mu_1, \mu_2, \ldots, \mu_n$, whose values have been stored in the memory 2 of the motion determination module 1. These motion vectors can thus be read asynchronously by a display function which displaces a symbol (such as a cursor) on a computer screen based on said vectors, such that the cursor motion follows the movement of the optical mouse.

The dimensions $X_n, Y_n$ (on the X and Y axes), of the correlation block used in determining the motion vector associated with the image $I_n$, have also been stored in the memory 2 in association with an identifier for the image $I_n$. The values of the pixels in the image $I_n$ are also stored in the memory 2.

Determining the Size of the Correlation Block to be Used for Determining the Motion Vector $\mu_{n+1}$ Associated with the Image $I_{n+1}$ For the processing of an image $I_{n+1}$, the recent evolution of the mouse displacement speed will be determined and the correlation block size to be used for the determination of the motion vector $\mu_{n+1}$ associated with the image $I_{n+1}$ will be adjusted as a function of this evolution, in accordance with the process Proc1 implemented by the module 3.

For this purpose, in a step 101, a first averaged mouse speed value $V_n$ will be calculated as a function of the motion vectors $\mu_n, \mu_{n-1}, \ldots, \mu_{n-k+1}$ respectively associated with the images $I_n, I_{n-1}, \ldots, I_{n-k+1}$ (where k=3 for example) using the following formula:

$$V_n = F \frac{\|\mu_n\| + \|\mu_{n-1}\| + \ldots + \|\mu_{n-k+1}\|}{k},$$

where $\|\mu_i\|$ represents the normal motion vector $\mu_i$ associated with the image $I_i$, and where i is an index ranging from i=n−k+1 to i=n.

This first speed value thus takes into account the displacement speed between the images $I_{n-1}$ and $I_n$, determined as a function of the motion vector associated with the image $I_n$.

In a step 102, a second averaged mouse speed value $V_{n-1}$ is calculated as a function of the motion vectors $\mu_{n-1}, \mu_{n-2}, \ldots, \mu_{n-k}$ respectively associated with the images $I_{n-1}, I_{n-2}, \ldots, I_{n-k}$ (where k=3 for example) using the following formula:

$$V_{n-1} = F \frac{\|\mu_{n-1}\| + \|\mu_{n-2}\| + \ldots + \|\mu_{n-k}\|}{k},$$

where $\|\mu_i\|$ represents the normal motion vector $\mu_i$ associated with the image $I_i$, and where i is an index ranging from i=n−k to i=$_{n-1}$.

In one embodiment, the value $V_n$ is stored so that it can be directly reused in determining the correlation block size in order to determine the motion vector associated with the image $I_{n+2}$.

Then, in a step 103, the evolution in the averaged mouse displacement speed is determined by comparing $V_n$ and $V_{n-1}$.

If $V_n$ is greater than $V_{n-1}$, it is deduced that the mouse displacement speed is increasing. Otherwise it is deduced that the mouse displacement speed is decreasing.

Then the size of the correlation block subsequently used in the process Proc2 is determined as a function of the evolution in the determined mouse displacement speed.

In a step 104, if it was established in step 103 that the mouse displacement speed is decreasing, then the correlation block size used for the determination of the displacement vector associated with the image $I_{n+1}$ is increased relative to the correlation block size used previously for the determination of the displacement vector associated with the image $I_n$. For example, the dimensions $X_{n+1}, Y_{n+1}$ of the correlation block used in determining the motion vector associated with the image $I_{n+1}$ are determined using the following formula: $X_{n+1}=X_n+a$ and $Y_{n+1}=X_n+b$, where a and b are natural numbers and neither one of them is zero, and $X_n$ and $Y_n$ are the dimensions of the correlation block previously used in determining the motion vector associated with the image $I_n$.

In a step 105, if it was established in step 103 that the mouse displacement speed is increasing, then the size of the correlation block used in determining the displacement vector associated with image $I_{n+1}$ is decreased relative to the size of the correlation block previously used in determining the displacement vector associated with the image $I_n$. For example, the dimensions $X_{n+1}, Y_{n+1}$ of the correlation block used in determining the motion vector associated with the image $I_{n+1}$ are determined using the following formula: $X_{n+1}=X_n-a$ and $Y_{n+1}=X_n-b$, where a and b are natural numbers and neither one of them is zero. For example, a=b=1 pixel.

The determined size of the correlation block is then $X_{n+1} \times Y_{n+1}$.

The depth k of the smoothing of the displacement speed value is programmable.

Other techniques can be used, depending on the process for estimating the evolution in the mouse displacement speed. In addition, other techniques for determining the manner in which the correlation block size is increased or decreased as a function of the evolution of the mouse displacement speed are also applicable.

Determining the Motion Vector $\mu_{n+1}$ for a Correlation Block of a Determined Size $X_{n+1} \times Y_{n+1}$ Then, for the processing of an image $I_{n+1}$ in accordance with the process Proc2 implemented by the module 4, an initial reference motion vector is first selected from a set of motion vectors.

In one embodiment, this set comprises the vector of zero components as well as the motion vector associated with the previously processed image $I_n$ in the sequence of captured images. Consider the block of pixels of dimensions $X_{n+1}$, $Y_{n+1}$ defined above with reference to the image $I_{n+1}$, if the following steps are applied to the pixels in this block of pixels.

Figure 4:
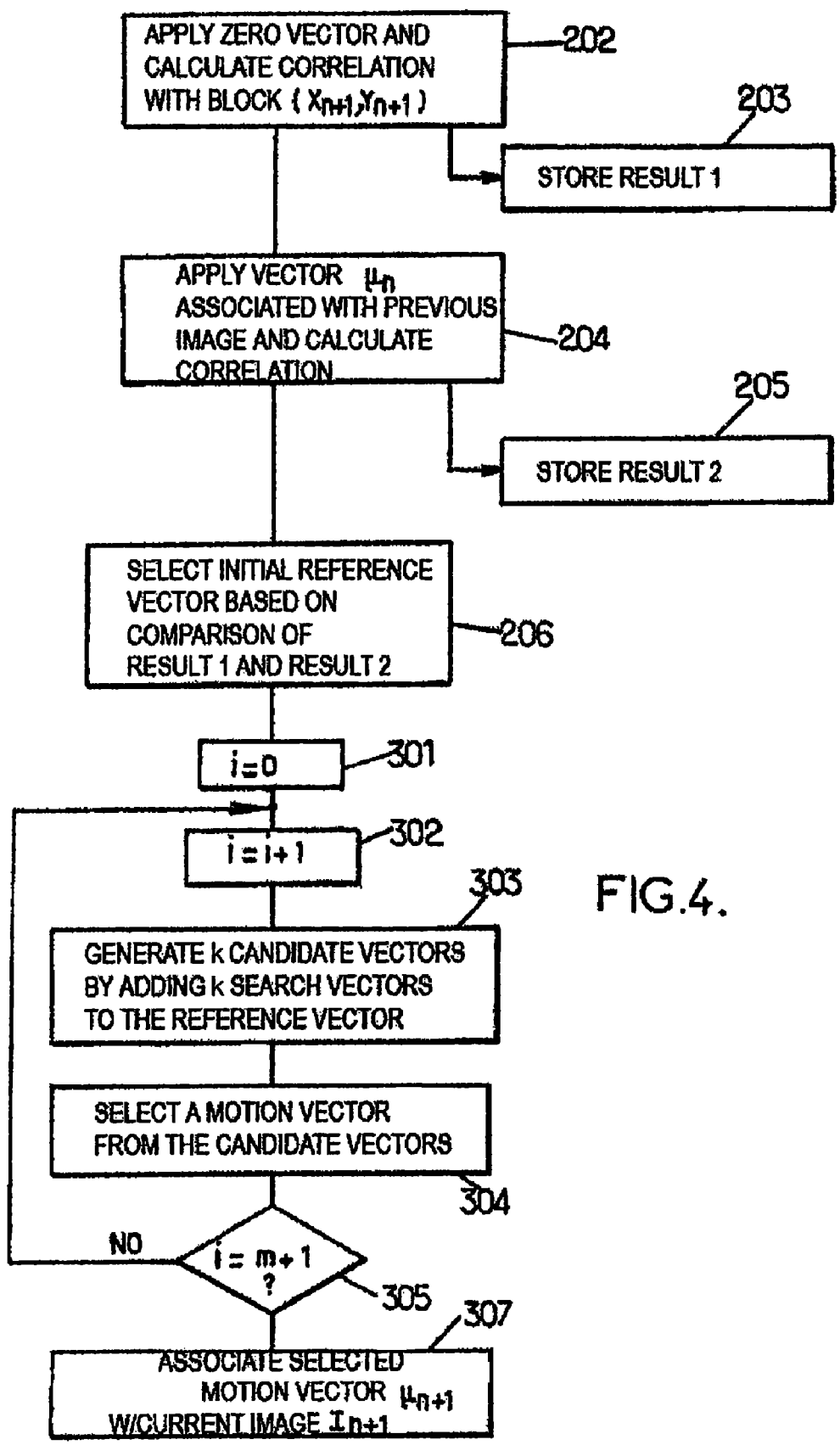

Referring to FIG. 4, in step 202, the zero vector is applied to the block of pixels of size $X_{n+1}$ by $Y_{n+1}$ defined above, in the image $I_n$, with said block being centered relative to the center of the image $I_n$, and a correlation is calculated between the value of the pixels in the block of pixels in question in the image $I_n$ and the value of the pixels in the corresponding block of pixels pointed to in the image $I_{n+1}$.

For this purpose, for each of the pixels in the correlation block in the image $I_n$, one can for example calculate the difference between the value of this pixel and the value of the pixel pointed to by the zero vector in the image $I_{n+1}$. Then the absolute values of the differences so obtained are summed and a first correlation result is obtained.

In step 203, the result of this correlation is then weighted by a value, which is preferably a configured value, before being stored in memory. Such a weighting is optional and is intended to improve the precision of such a process. A weighting value can advantageously be determined as a function of the speed of the images in the captured image sequence.

Then, in step 204, applied to the block of pixels of size $X_{n+1}$ by $Y_{n+1}$ in question in the image $I_n$, is the motion vector $\mu_n$ already associated with this image. A correlation calculation is performed. For this purpose, for each pixel in the block of pixels in question in the image $I_n$, preferably the difference is calculated between the value of a given pixel in the image $I_n$ and the value of the corresponding pixel in the image $I_{n+1}$ meaning the pixel in the image $I_{n+1}$ pointed to from the pixel given by the motion vector $\mu_n$ associated with the image $I_n$.

The absolute values of the differences are summed and thus a second correlation result is obtained, which is stored in the memory 2 in step 205.

In step 206, the first and second correlation results are compared and on the basis of this comparison the vector is selected, from among the null vector and the motion vector associated with the image $I_n$, which obtains the highest correlation.

In step 301, the initially selected reference vector is examined and an index i is initialized to 0.

Then, in step 302, the index i is incremented by one.

Next in step 303, k candidate vectors are generated, where k is a whole number greater than 1. These candidate vectors are generated by adding k respective search vectors to the initial reference vector. For example, two of these vectors can be horizontal in respectively opposite directions, while the two others are vertical in respectively opposite directions. These k search vectors can therefore advantageously be four in number. There can, however, be more or less, and in directions other than vertical and horizontal.

In step 304, a motion vector is selected from the candidate vectors generated in this manner. In particular, the selection can be made by calculating for each of these candidate vectors a correlation between the block of pixels of size $X_{n+1}$ by $Y_{n+1}$ already under consideration in the image $I_n$ and the block of pixels pointed to in the image $I_{n+1}$, by applying the candidate vector to the block of pixels under consideration in the image $I_n$.

The steps 302, 303, and 304 are performed m+1 times, where m is a whole number greater than 1. For this reason, in step 305, the value of the index i is compared to the value m+1. If i is less than m+1, steps 302 to 305 are repeated.

In this case, at each repetition of step 303, the reference motion vector is the motion vector selected in the step 304 just performed.

After m repetitions of steps 302 to 304, step 307 is then performed. In this step, the motion vector selected in the previous step 304 is associated with the image $I_{n+1}$ currently being processed.

In one embodiment, all or part of the steps indicated above are performed in response to the execution of computer program instructions by the calculation means of the motion determination module 1, such as a processor.

In the embodiment described above with reference to the figures, square images were used and the correlation blocks were also square in shape. Embodiments may be implemented with images and correlation blocks of other shapes, and the shape of a correlation block in an image can be different from the shape of the image.

In another embodiment, the determination of the correlation block size for determining the motion vector associated with the image $I_{n+1}$ is performed as a function of the motion vector associated with the image $I_n$ and not the motion vectors associated with other images (for example, a fixed block size value corresponds to a motion vector value).

In another embodiment, the determination of the correlation block size for determining the motion vector associated with the image $I_{n+1}$ is performed as a function of the motion vector associated with the image $I_n$ and not the motion vectors associated with other images, and as a function of the size of the correlation block used in determining the motion vector associated with a previous image, for example the image $I_n$.

In another embodiment, the determination of the block size of the image $I_{n+1}$ is performed as a function of the motion vector associated with the image $I_n$ and not the motion vectors associated with other images, and as a function of the size of the correlation blocks used in determining the motion vector associated with several previous images.

Other methods of adapting the size of the correlation block can of be implemented according to the subject matter of this disclosure.

The various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A process, comprising:
   determining displacement of an entity equipped with a sensor for capturing a sequence of images, by,
   determining dimensions of a correlation block of pixels in a current image in the sequence of images as a function of a motion vector associated with an image preceding the current image in the sequence of images; and
   determining a motion vector associated with the current image in the sequences of images as a function of at least one correlation calculated between the correlation block of pixels in the current image and a second block of pixels from which the vector points towards said correlation block of pixels, with the second block being in a previous image in the sequence of images, wherein a size of the correlation block is a decreasing function of the motion vector associated with the previous image in the sequence of images.

2. The process according to claim 1 wherein the dimensions of the correlation block are determined as a function of a plurality of motion vectors associated with previous images in the sequence of images.

3. The process according to claim 1 wherein a size of the correlation block is determined as a function of at least one block size used in determining the motion vector associated with the image preceding the current image in the sequence of images.

4. The process of claim 1 wherein the second block is in the image immediately preceding the current image in the sequence of images.

5. A process, comprising:
determining displacement of an entity equipped with a sensor for capturing a sequence of images, by,
determining dimensions of a correlation block of pixels in a current image in the sequence of images as a function of a plurality of motion vectors associated with previous images in the sequence of images; and
determining a motion vector associated with the current image in the sequence of images as a function of at least one correlation calculated between the correlation block of pixels in the current image and a second block of pixels from which the vector points towards said correlation block of pixels, with the second block being in a previous image in the sequence of images, wherein the determining the dimensions of the correlation block of pixels includes estimating a parameter as a function of the plurality of motion vectors respectively associated with previous images in the sequence of images, with the parameter indicating an evolution in a displacement speed of the entity, and wherein the size of the correlation block is a decreasing function of the parameter.

6. A process, comprising:
determining displacement of an entity equipped with a sensor for capturing a sequence of images, by,
determining dimensions of a correlation block of pixels in a current image in the sequence of images as a function of a plurality of motion vectors associated with respective previous images in the sequence of images; and
determining a motion vector associated with the current image in the sequence of images as a function of at least one correlation calculated between the correlation block of pixels in the current image and a second block of pixels from which the vector points towards said correlation block of pixels, with the second block being in a previous image in the sequence of images, wherein a size of the correlation block is determined as a function of at least one block size used in determining the motion vector associated with the image preceding the current image in the sequence of images, and the determining dimensions of the correlation block of pixels includes estimating a parameter as a function of the plurality of motion vectors respectively associated with previous images in the sequence, with the parameter indicating an evolution of a displacement speed of the entity, and wherein if the parameter indicates an increase in the speed, the determined size of the correlation block is less than a size of the second block.

7. A process, comprising:
determining displacement of an entity equipped with a sensor for capturing a sequence of images, by,
determining dimensions of a correlation block of pixels in a current image in the sequence of images as a function of a plurality of motion vector associated with respective image preceding the current image in the sequence of images;
determining a motion vector associated with the current image in the sequence of images as a function of at least one correlation calculated between the correlation block of pixels in the current image and a second block of pixels from which the vector points towards said correlation block of pixels, with the second block being in a previous image in the sequence of images, wherein a size of the correlation block is determined as a function of at least one block size used in determining the motion vector associated with the image preceding the current image in the sequence of images, and the determining the dimensions of the correlation block of pixels includes estimating a parameter as a function of the plurality of motion vectors respectively associated with previous images in a sequence, with the parameter indicating an evolution in a displacement speed of an entity, and wherein if the parameter indicates a decrease in the speed, the determined size of the correlation block is greater than a size of the second block.

8. A process, comprising:
determining displacement of an entity equipped with a sensor for capturing a sequence of images, by,
determining dimensions of a correlation block of pixels in a current image in the sequence of images as a function of a motion vector associated with an image preceding the current image in the sequence of images;
determining a motion vector associated with the current image in the sequence of images as a function of at least one correlation calculated between the correlation block of pixels in the current image and a second block of pixels from which the vector points towards said correlation block of pixels, with the second block being in a previous image in the sequence of images, wherein a size of the correlation block is determined as a function of at least one block size used in determining the motion vector associated with the image preceding the current image in the sequence of images, and wherein determining the motion vector associated with the current image in the sequence of images includes:
generating a plurality of candidate motion vectors;
for each of the candidate motion vectors, calculating a correlation between the correlation block of pixels in the current image and the second block of pixels; and
selecting the motion vector associated with the current image as a function of a comparison between the correlation calculations preformed.

9. A non-transitory computer-readable memory medium whose contents cause a processor to perform a method, the method comprising:
determining dimensions of a correlation block of pixels in a current image in a sequence of images as a function of a motion vector associated with an image preceding the current image in the sequence of images; and
determining a motion vector associated with the current image in the sequences of images as a function of at least one correlation calculated between the correlation block of pixels in the current image and a second block of pixels from which the vector points towards said correlation block of pixels, with the second block being in a previous image in the sequence of images, wherein a size of the correlation block is a decreasing of the motion vector associated with the previous image in the sequence of images.

10. The non-transitory computer-readable memory medium of claim 9 wherein the dimensions of the correlation block are determined as a function of a plurality of motion vectors associated with previous images in the sequence of images.

11. The non-transitory computer-readable memory medium of claim 9 wherein a size of the correlation block is determined as a function of at least one block size used in determining the motion vector associated with the image preceding the current image in the sequence of images.

12. A non-transitory computer-readable memory medium whose contents configure a processor to perform a method, the method comprising:
estimating a parameter as a function of a plurality of motion vectors respectively associated with previous images in a sequence of images, with the parameter indicating an evolution in a displacement speed of an entity;
determining dimensions of a correlation block of pixels in a current image in the Sequence of images as a function of the parameter, wherein a size of the correlation block is a decreasing function of the parameter; and
determining a motion vector associated with the current image in the sequences of images as a function of at least one correlation between the correlation block of pixels in the current image and a second block of pixels from which the vector points towards said correlation block of pixels, with the second block being in a previous image in the sequence of images.

13. A non-transitory computer-readable memory medium whose contents configure a processor to perform a method, the method comprising:
estimating a parameter as a function of a plurality of motion vectors respectively associated with previous images in a sequence of images, with the parameter indicating an evolution of a displacement speed of an entity;
determining dimensions of a correlation block of pixels in a current image in the sequence of images as a function of the parameter; and
determining a motion vector associated with the current image in the sequence of image as a function of at least one correlation calculated between the correlation block of pixels in the current image and a second block of pixels from which the vector points towards said correlation block of pixels, with the second block being in a previous in the sequence of image, wherein if the parameter indicates an increase in the speed, the determined size of the correlation block is less than a size of second block.

14. A non-transitory computer-readable memory medium whose contents configure a processor to perform a method, the method comprising:
determining dimensions of a correlation block of pixels in a current image in a sequence of images as a function of a motion vector associated with an image preceding the current image in the sequence of images; and
determining a motion vector associated with the current image in the sequence of images as a function of at least one correlation calculated between the correlation block of pixels in the current image and a second block of pixels from which the vector points towards said correction block of pixels, with the second block of pixels from which the vector points toward said correlation block of pixels, with the second block being in a previous image in the sequence of images, wherein determining the motion vector associated with the current image in the sequence of images comprises:
generating a plurality of candidate motion vectors;
for each of the candidate motion vectors, calculating a correlation between the correlation block of pixels in the current image and the second block of pixels; and
selecting the motion vector associated with the current image as a function of a comparison between the correlation calculations performed.

15. A circuit, comprising:
a memory configured to store historical data associated with an image in a sequence of images preceding a current image in the sequence of images;
a correlation block dimension generator coupled to the memory and configured to generate dimensions of a correlation block of pixels associated with the current image in the sequence of images based on the stored historical data; and
an image motion vector generator coupled to the memory and configured to generate a motion vector associated with the current image based on the stored historical data and the correlation block of pixels associated with the current image, wherein the image motion vector generator is configured to generate the motion vector associated with the current image by:
generating a plurality of candidate motion vectors;
for each of the candidate motion vector, calculating a correlation between the correlation block of pixels associated with the current image and a correlation block of pixels associated with the image preceding the current image in the sequence of images; and
selecting the motion vector associated with the current image based on a comparison of the calculated correlations.

16. The circuit of claim 15, further comprising:
an image sensor coupled to the memory.

17. The circuit of claim 15 wherein the historical data further includes data associated with a second image preceding the current image in the sequence of images.

18. The circuit of claim 15 wherein the historical data associated with the image preceding the current image includes a motion vector associated with the image preceding the current image.

19. The circuit of claim 18 wherein the historical data associated with the image preceding the current image includes a correlation block of pixels associated with the image preceding the current image.

20. An optical mouse, comprising:
means for storing historical data associated with an image in a sequence of images preceding a current image in the sequence of images;
means for selectively modifying dimensions of a correlation block of pixels associated with the current image in the sequence of images based on the stored historical data; and
means for generating a motion vector associated with the current image based on the stored historical data and the correlation block of pixels associated with the current image, wherein a size of the correlation block is a decreasing function of a motion vector associated with the image preceding the current image in the sequence of images.

21. The optical mouse of claim 20 wherein the means for selectively modifying the dimensions of the correlation block of pixels associated with the current image comprises a correlation block dimension generator.

22. A system comprising:
  means for generating a sequence of images;
  means for storing historical data associated with an image in the sequence of images preceding a current image in the sequence of images;
  means for generating dimensions of a correlation block of pixels associated with the current image in the sequence of images based on the stored historical data; and
  means for generating a motion vector associated with the current image based on the stored historical data and the correlation block of pixels associated with the current image, wherein the means for generating a motion vector is configured to generate the motion vector associated with the current image by:
    generating a plurality of candidate motion vectors;
    for each of the canidate motion vectors, calculating a correlation between the correlation block of pixels associated with the current image and a correlation block of pixels associated with the image preceding the current image in the sequence of images; and
    selecting the motion vector associated with the current image based on a comparison of the calculated correlations.

23. The system of claim 22 wherein the means for generating the dimensions of the correlation block of pixels associated with the current image comprises a correlation block dimension generator.

* * * * *